(12) United States Patent
Zahlen et al.

(10) Patent No.: US 12,508,681 B2
(45) Date of Patent: Dec. 30, 2025

(54) ASSEMBLY OF COMPONENTS TO BODIES

(71) Applicants: Airbus Operations Limited, Bristol (GB); Airbus Operations GmbH, Hamburg (DE)

(72) Inventors: Pierre Zahlen, Hamburg (DE); Guilherme Barsali, Bristol (GB); Dominique Chasteau, Bristol (GB)

(73) Assignees: Airbus Operations Limited, Filton Bristol (GB); Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/787,473

(22) Filed: Jul. 29, 2024

(65) Prior Publication Data
US 2025/0042541 A1 Feb. 6, 2025

(30) Foreign Application Priority Data
Jul. 31, 2023 (GB) .................................. 2311742

(51) Int. Cl.
*B23P 19/10* (2006.01)

(52) U.S. Cl.
CPC ........... *B23P 19/10* (2013.01); *B23P 2700/01* (2013.01)

(58) Field of Classification Search
CPC ...... B23P 19/10; B23P 2700/01; B64C 25/04; B64F 5/10
See application file for complete search history.

(56) References Cited

U.S. PATENT DOCUMENTS

| | | | | |
|---|---|---|---|---|
| 2,158,300 A | * | 5/1939 | Page, Jr. | B64C 25/18 244/102 R |
| 5,799,408 A | * | 9/1998 | Sprayberry | G01B 5/25 33/645 |
| 10,828,760 B2 | * | 11/2020 | Guering | B25B 27/16 |
| 11,371,295 B2 | * | 6/2022 | Nguyen | E21B 33/038 |
| 2017/0182643 A1 | | 6/2017 | Guering | |

FOREIGN PATENT DOCUMENTS

| | | | | |
|---|---|---|---|---|
| CN | 114932403 A | | 8/2022 | |
| CN | 114932403 B | * | 7/2023 | ............... B23P 19/10 |
| EP | 597688 A1 | * | 5/1994 | |
| NO | 20210440 A1 | * | 10/2021 | ............... E21B 41/10 |
| RU | 2573856 C1 | * | 1/2016 | |
| WO | WO-2020118318 A2 | * | 6/2020 | ............ B25B 11/002 |

OTHER PUBLICATIONS

United Kingdom Search Report for corresponding United Kingdom Patent Application No. 2311742.7 dated Jul. 24, 2024.
United Kingdom Search Report for corresponding United Kingdom Patent Application No. 2311742.7 dated Dec. 11, 2023.

* cited by examiner

*Primary Examiner* — Bayan Salone
(74) *Attorney, Agent, or Firm* — Greer, Burns & Crain, Ltd.

(57) ABSTRACT

A method for assembling a component to an aircraft body portion comprises using a funnel device to guide a portion of the component relative to the body portion for movement into a desired position for assembly. Also a funnel device which is configured to be supported by a body portion in a predetermined position and orientation relative to an orifice of the body portion during an assembly process. Also, a pintle mounting portion of an aircraft landing gear assembly is funneled into a predetermined position relative to a pintle mount portion of an aircraft body.

10 Claims, 13 Drawing Sheets

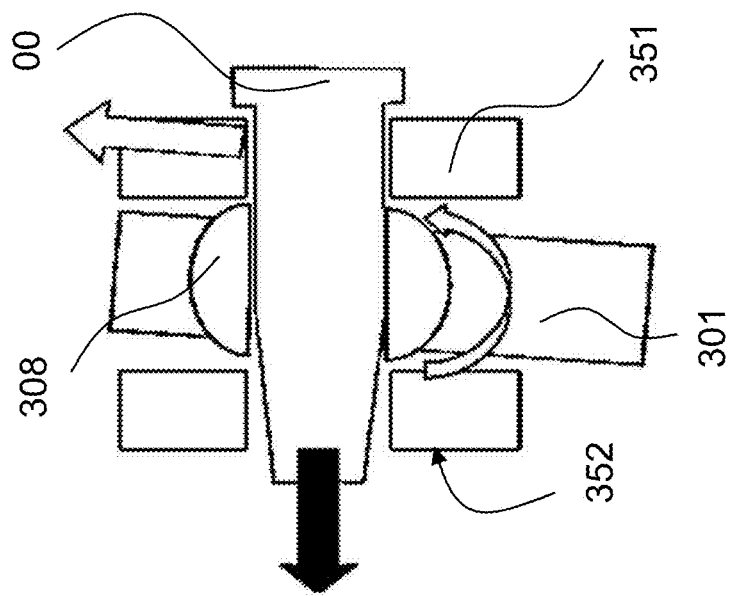
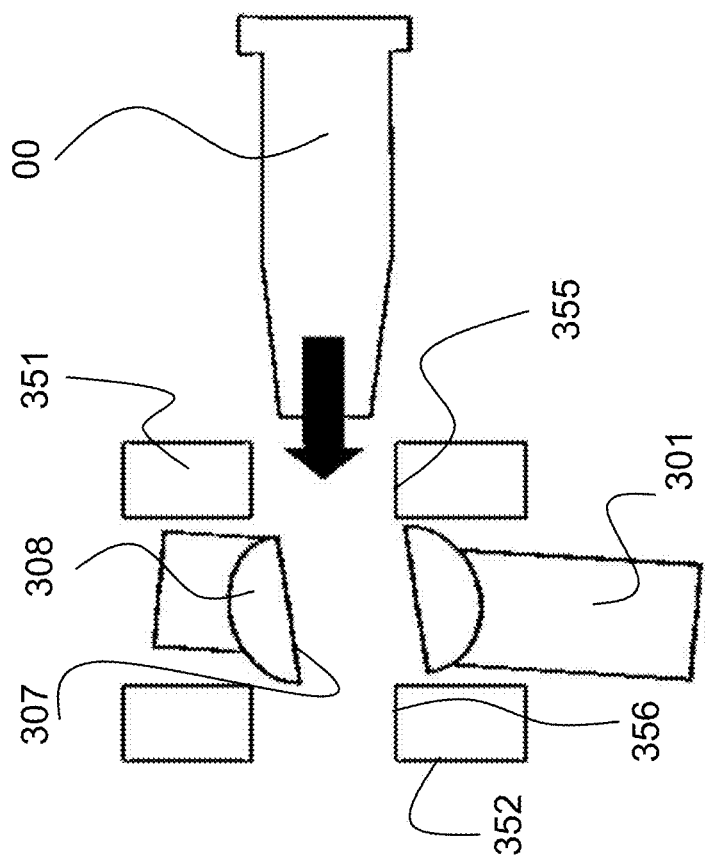
Fig. 4b
Fig. 4a

ASSEMBLY OF COMPONENTS TO BODIES

CROSS-REFERENCES TO RELATED APPLICATIONS

This application claims the benefit of Great Britain Patent Application Number 2311742.7 filed on Jul. 31, 2023, the entire disclosure of which is incorporated herein by way of reference.

FIELD OF THE INVENTION

The present invention concerns assembly of components to bodies. More particularly, but not exclusively, this invention concerns a method for assembling a component to an aircraft body portion, a funnel device to funnel a portion of a component into a predetermined position relative to a body portion, a method of assembling an aircraft landing gear assembly to an aircraft comprising axially moving a pin, and a pintle pin having a tapered end portion.

BACKGROUND OF THE INVENTION

FIG. 1a shows an aircraft 101 having landing gear door components 110 including landing gear doors and door fairings in a closed configuration, with the associated landing gear assemblies (not shown) retracted in their respective landing gear bays. FIG. 1b shows a portion of the aircraft 101 with a landing gear bay 130 and a landing gear assembly 120, in the form of a main landing gear assembly, together with associated components, in an extended configuration. During extension and retraction, the landing gear assembly 120 pivots on forward and aft pintle mountings 125 and 130 respectively. A landing gear assembly is typically supplied from a component manufacturer together with forward and aft pintle pins. As shown in FIG. 2, the landing gear assembly 120 has a forward pintle pin 210 which is shown already attached to the forward pintle mounting 125. An aft pintle pin 220 is to be fitted to the aft pintle mounting 130 when the landing gear assembly 120 is in position and correctly aligned with the airframe.

During installation of the landing gear assembly 120, the landing gear assembly 120 must be carefully and accurately moved into position in alignment with the airframe so that the forward and aft pintle pins 210 and 220 can be inserted respectively through orifices of the forward and aft pintle mountings 125, 130 of the landing gear assembly 120 and into orifices of respective forward and aft lugs (not shown) of the airframe to mount the landing gear assembly 120 to the airframe. The clearances between radially outer surfaces of the pintle pins 210, 220 and respective radially inner surfaces of the orifices are generally small, and are specified with low tolerances, and accurate axial alignment of the orifices of the forward and aft pintle mountings 125, 130 of the landing gear assembly 120 with the orifices of respective forward and aft lugs of the airframe is required to enable pin insertion. Furthermore, the landing gear assembly must be brought into the aligned position in a careful and controlled manner during the installation process, so as not to impact on portions of the aircraft in the vicinity of the installation, due to the safety critical nature of aircraft body parts.

Known methods of assembling a landing gear assembly to an aircraft body portion can be time consuming and/or risk damage to components because of the requirement to carefully maneuver the landing gear pintle orifices into the installation position without impacting against aircraft body portions, and/or because of the requirement for accurate and precise axial alignment of respective pintle orifices of the landing gear and the airframe in order to accommodate the small clearances and precise tolerances relative to the pintle pins.

Further, known methods of installing large and heavy landing gear assemblies use machines, such as hoists or hydraulically powered trolley lifts, and/or other mechanisms controlled by an operator, to lift and to actively drive adjustment of the position of a landing gear assembly during installation. Such machines and/or mechanisms may be difficult for an operator to control with appropriate levels of speed and/or force and/or accuracy required to ensure that the risks of impact are appropriately mitigated, and/or that the installation process is performed with a desired timeliness. Furthermore, known machines and/or mechanisms commonly do not have controls located so as to enable an operator to view key portions of the landing gear assembly and the airframe, for example respective pintle orifices, while operating the controls.

For example, EP 597688 A1 discloses an aircraft landing gear trolley for supporting a landing gear and adjusting the position of pintle bearings in relation to pintle mountings on an aircraft. The trolley includes a rolling chassis and a number of frames, each arranged to provide a different degree of freedom for the landing gear. The trolley includes two groups of nested frames. Firstly, a "Y" frame carrying an "X" frame which carries a "slewing" frame. Secondly, a "pivot" frame carries a landing gear mounting frame both of which may be raised and lowered with respect to the first group of frames by a scissor jack mechanism operated by hydraulic struts.

The present invention seeks to mitigate one or more of the above-mentioned problems. Alternatively or additionally, the present invention seeks to provide an improved apparatus to support a heavy component in an installation location, and/or method of assembling a heavy component to a mount portion of a body, and/or method for assembling a component to an aircraft body portion, and/or funnel device, and/or pintle pin.

SUMMARY OF THE INVENTION

According to a first aspect of the invention, there is provided a method for assembling a component to an aircraft body portion, the method comprising using a funnel device to guide a portion of the component relative to the body portion for movement into a desired position for assembly. Use of a funnel in this manner facilitates simpler, and/or easier, and/or quicker, and/or more accurate assembly. Additionally or alternatively, such use facilitates mitigation of risk with regard to the component potentially impacting the body portion during assembly, by guiding and shielding the guided portion of the component within the funnel device.

Preferably, the funnel device is supported in a predetermined position relative to the body portion. The method preferably comprises engaging the funnel device with the body portion to temporarily retain the funnel device in the predetermined position. The body portion preferably defines an orifice for receiving a mounting pin, the method comprising locating the funnel device in a predetermined position relative to the orifice of the body portion.

The funnel device may be configured to receive and guide a mounting portion of the component, the mounting portion defining an orifice for receiving the mounting pin, the method further comprising placing the mounting portion proximal the funnel device and applying force to the component to move the mounting portion into and through the funnel device, whereby the mounting portion is funneled such that the orifice of the mounting portion is brought into approximate axial alignment with an orifice of the body portion.

Preferably, the method further comprises moving a pin, having a tapered end portion, through the orifice of the component and the orifice of the body portion such that the pin brings the orifices into final mutual axial alignment.

The component may comprise a landing gear assembly for an aircraft, the mounting portion extending upwardly from a strut of the landing gear assembly and housing a pintle bearing or bush defining the orifice of the mounting portion, and the body portion may comprise a lug housing a pintle bush or bearing defining the orifice of the body portion, the method further comprising bringing the orifices into alignment relative to a pintle axis.

Preferably, the pin having a tapered end portion is a pintle pin. A simpler and quicker assembly process is thereby facilitated.

The method may further comprise using more than one funnel to guide more than one respective portion of the component relative to the body portion for movement into a desired position for assembly. For example, rear and forward pintles of a landing gear assembly may be funneled together. Furthermore, other portions of the landing gear assembly, such as a sidestay portion or a retraction actuator portion of the landing gear assembly, may also be funneled into position for connection to the aircraft body, either together with the rear and forward pintles or alternatively in one or more respective separate funneling movements.

The method may further comprise supporting the component on a support apparatus, and vertically lifting the component on the support apparatus through the funnel, the support apparatus permitting movement of the component in at least one lateral direction under guidance forces exerted by the funnel.

According to a second aspect of the invention there is provided a funnel device configured to be supported by a body portion in a predetermined position and orientation relative to an orifice of the body portion during an assembly process, the funnel device being adapted to receive and funnel a portion of a component into a predetermined position relative to the body portion, to thereby position an orifice of the component in a desired position relative to the orifice of the body portion. Such a funnel device can facilitate simpler, and/or easier, and/or quicker, and/or more accurate assembly. Additionally or alternatively, the funnel device facilitates mitigation of risk with regard to the component potentially impacting the body portion during assembly by guiding and shielding the guided portion of the component within the funnel device.

The funnel device may comprise at least one internal guide surface formed by at least one wall, and defines a through passage having a mouth end portion to receive a protruding portion of the component, the passage having a cross sectional area that gradually narrows from the mouth end towards an opposite end portion of the passage, the opposite end portion having a cross sectional area configured to receive and locate the protruding portion in the predetermined position.

Preferably, contours of the funnel device are adapted to engage with contours of the body portion to enable the body portion to support the funnel in the predetermined position and orientation during the assembly process.

Preferably, the funnel device is configured to funnel a pintle mounting portion of an aircraft landing gear assembly into a predetermined position relative to a pintle mount portion of an aircraft body, such that a pintle orifice of the landing gear assembly is in a desired position relative to a pintle orifice of the aircraft.

The funnel device may be configured to locate between two prongs of an aft pintle bearing mount of an aircraft body, for funneling a pintle mounting portion of an aircraft landing gear assembly into a predetermined position between the prongs. The aft pintle bearing mount may support a spherical pintle bearing.

According to third aspect of the invention, there is provided a method of assembling an aircraft landing gear assembly to an aircraft, the method comprising causing a mounting orifice of the landing gear assembly and a mount orifice of the aircraft to overlap in partial relative axial alignment, and axially moving a pin, having a gradually tapering end portion, through the orifices such that the tapering surface of the pin drives and guides the landing gear assembly to bring the respective center axes of the orifices into alignment with each other. This facilitates simpler, and/or easier, and/or quicker, and/or more accurate assembly. Additionally or alternatively, such use facilitates mitigation of risk with regard to the component potentially impacting the body portion during assembly, by facilitating that the respective mounting orifices of the landing gear assembly and the aircraft self-align accurately and/or in one movement, and/or without using a lifting device for final alignment. Additionally or alternatively, accurate control of the alignment force by an operator is facilitated, for example by manually applying the control force.

Preferably, the pin is an aircraft landing gear pintle pin. This further facilitates simpler, and/or easier, and/or quicker assembly.

According to fourth aspect of the invention, there is provided a pintle pin for an aircraft, the pin having a tapered end portion extending axially for a distance at least equal to the non-tapered radius of the pin, and/or at an angle with the longitudinal axis of the pin of between 1° and 25°, preferably between 2° and 16°, more preferably between 3° and 8°. Use of such a pin facilitates simpler, and/or easier, and/or quicker, and/or more accurate assembly. Additionally or alternatively, such use facilitates mitigation of risk with regard to the component potentially impacting the body portion during assembly, by facilitating that the respective mounting orifices of the landing gear assembly and the aircraft self-align accurately and/or in one movement, and/or without using a lifting device for final alignment. Additionally or alternatively, accurate control of the alignment force by an operator is facilitated, for example by manually applying the control force.

There is also provided a method of i) engaging a funnel device with a body portion, ii) funneling a mounting portion of the component into approximate alignment with the body portion, and iii) optionally moving a tapered pin to bring orifices of the component and the body portion into final alignment. There is also provided a method of i) resiliently supporting a component on a platform, and ii) using the platform to resiliently assist vertical movement, the movement optionally caused by driving a tapered pin through the component, of the component into alignment with a body. There is also provided a method of i) supporting a component on a platform, and ii) using the platform to passively assist vertical movement, the movement optionally caused by driving a tapered pin through the component, of the component into alignment with a body.

There is also provided a method of i) engaging a funnel device with a body portion, ii) funneling a mounting portion of the component into approximate alignment with the body portion, and iii) optionally moving a tapered pin to bring orifices of the component and the body portion into final alignment.

It will of course be appreciated that features described in relation to one aspect of the present invention may be incorporated into other aspects of the present invention. For example, the method of the invention may incorporate any of the features described with reference to the apparatus of the invention and vice versa.

BRIEF DESCRIPTION OF THE DRAWINGS

Embodiments of the present invention will now be described by way of example only with reference to the accompanying schematic drawings of which:

FIG. 4a shows a pin being inserted through orifices of the component in accordance with the embodiment of FIG. 3;

FIG. 4b shows a pin being inserted through orifices of the body portion in accordance with the embodiment of FIG. 3;

DETAILED DESCRIPTION OF THE PREFERRED EMBODIMENTS

Figure 1A:
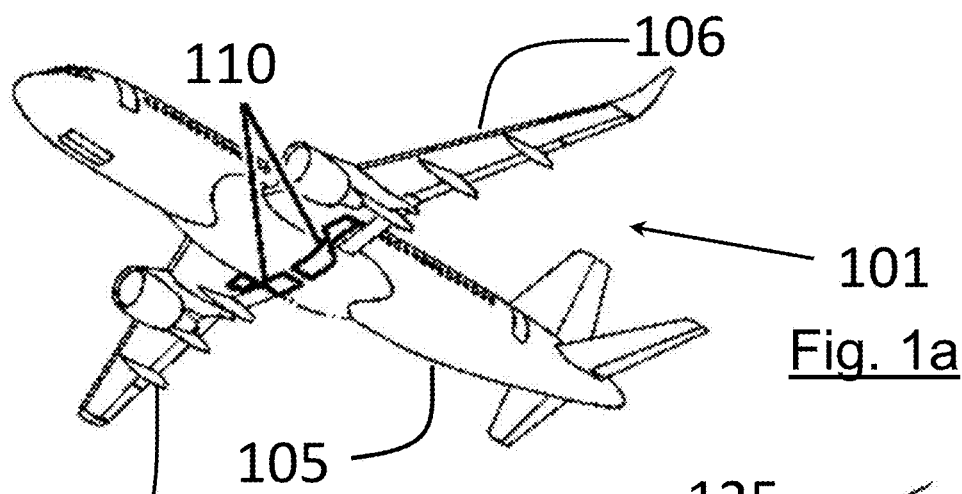
FIG. 1a show a known arrangement of an aircraft with retractable landing gear.
Figure 1B:
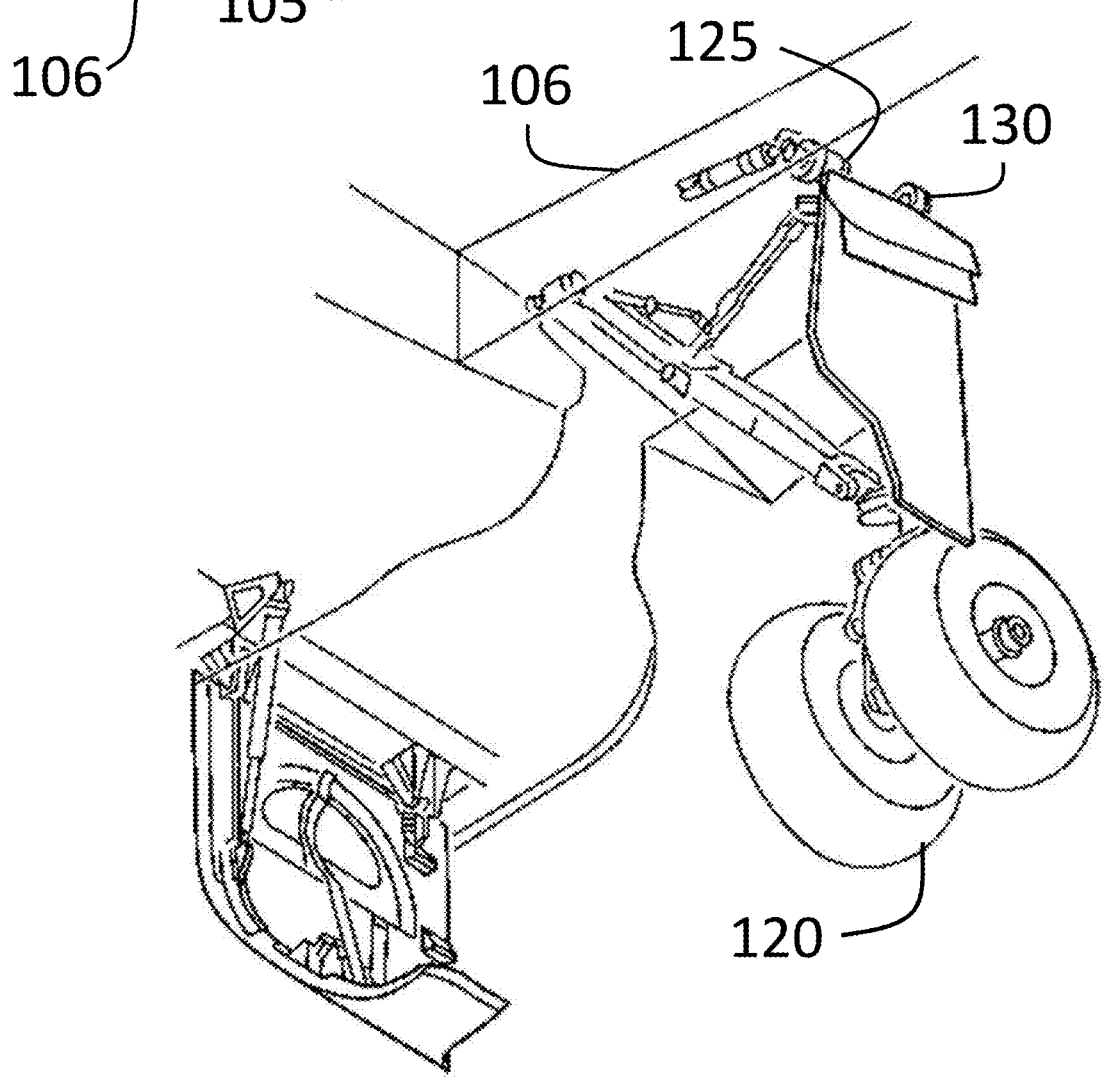
FIGS. 1b show another known arrangement of an aircraft with retractable landing gear.
Figure 2:
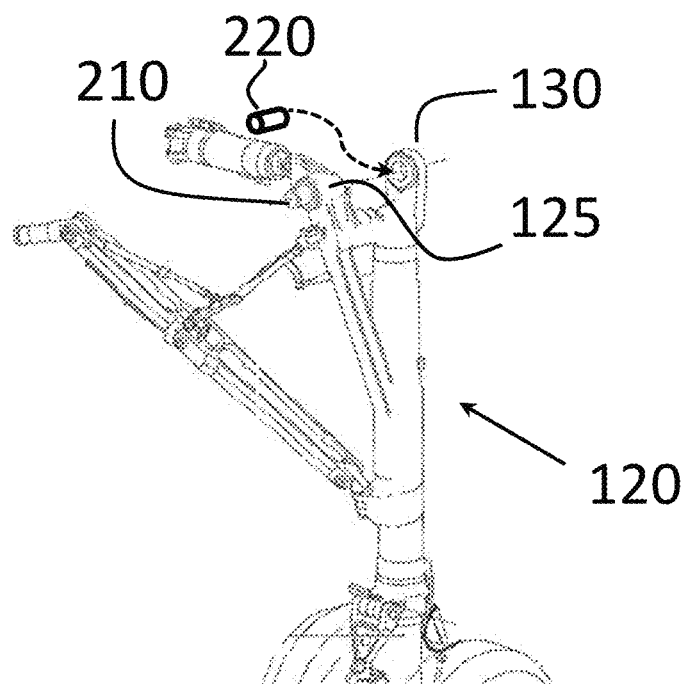
FIG. 2 shows in further detail the known landing gear assembly of FIGS. 1a and 1b.
Figure 3:
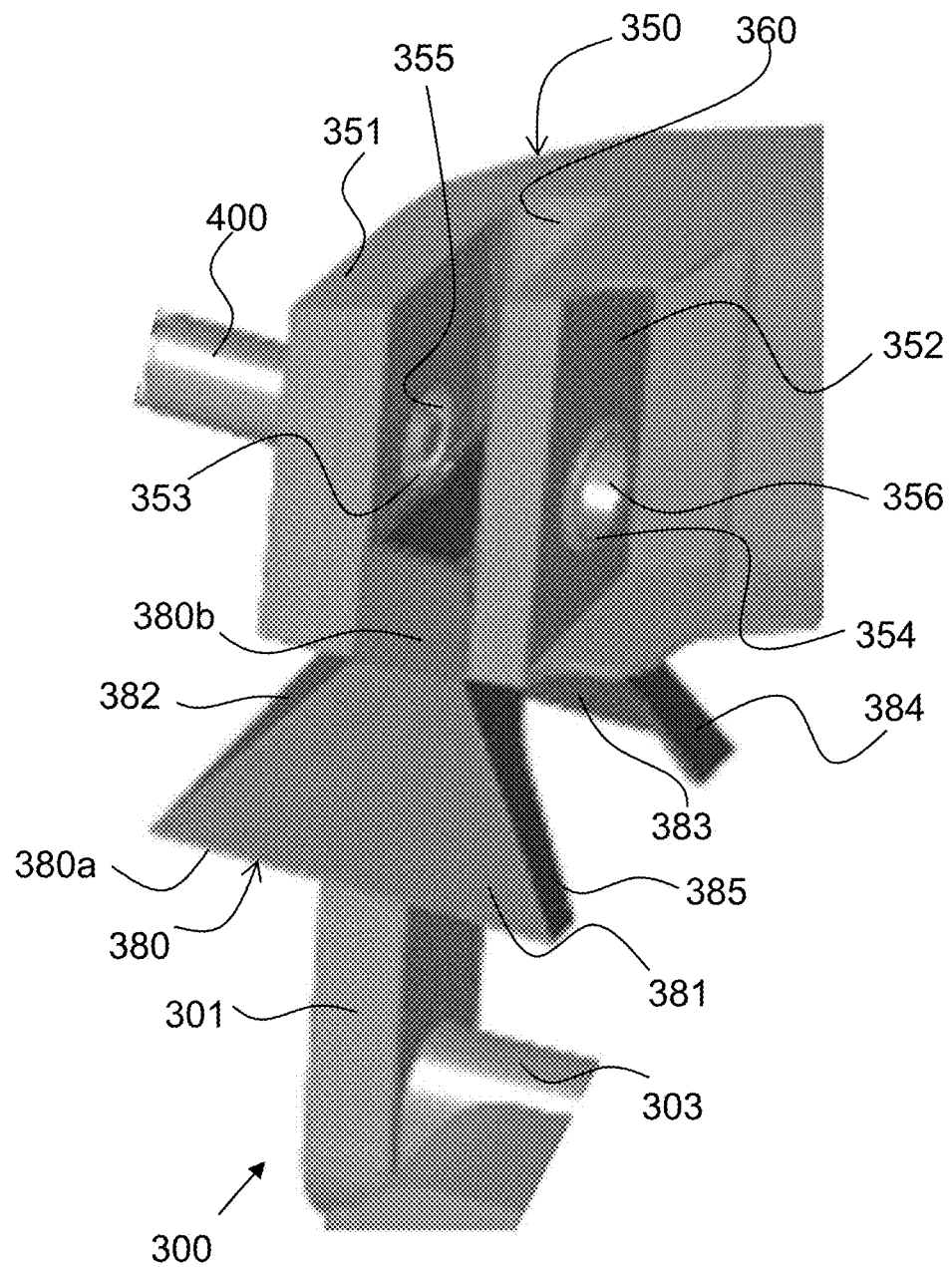
FIG. 3 shows a component being positioned relative to a body portion for assembly using a funnel in accordance with an embodiment.
Figure 7:
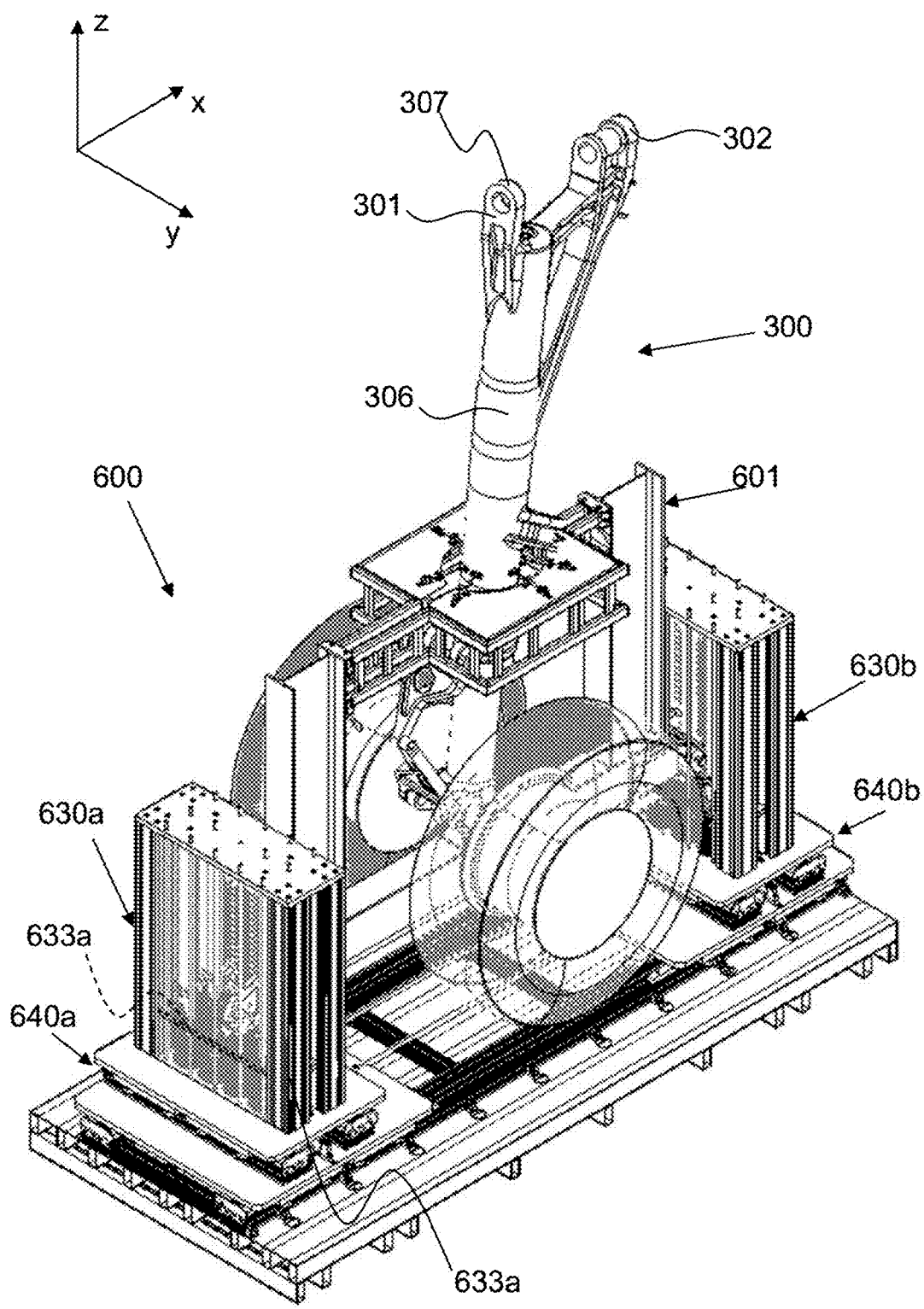
FIG. 7 is a perspective view of the support apparatus of FIG. 6, with a main landing gear assembly of an aircraft supported thereon.
Figure 8:
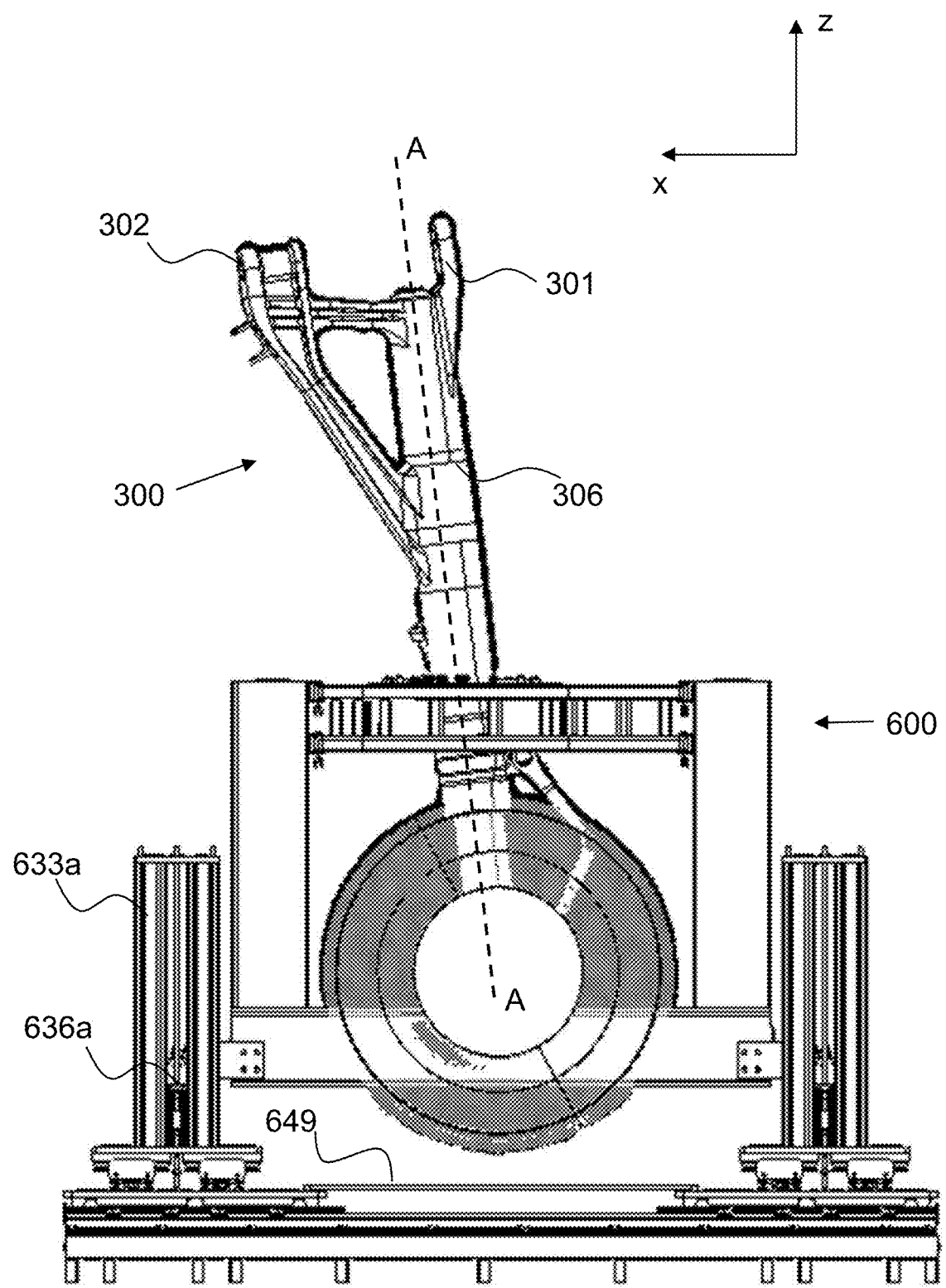
FIG. 8 is a side view of the support apparatus and landing gear assembly of FIG. 7.
Figure 9:
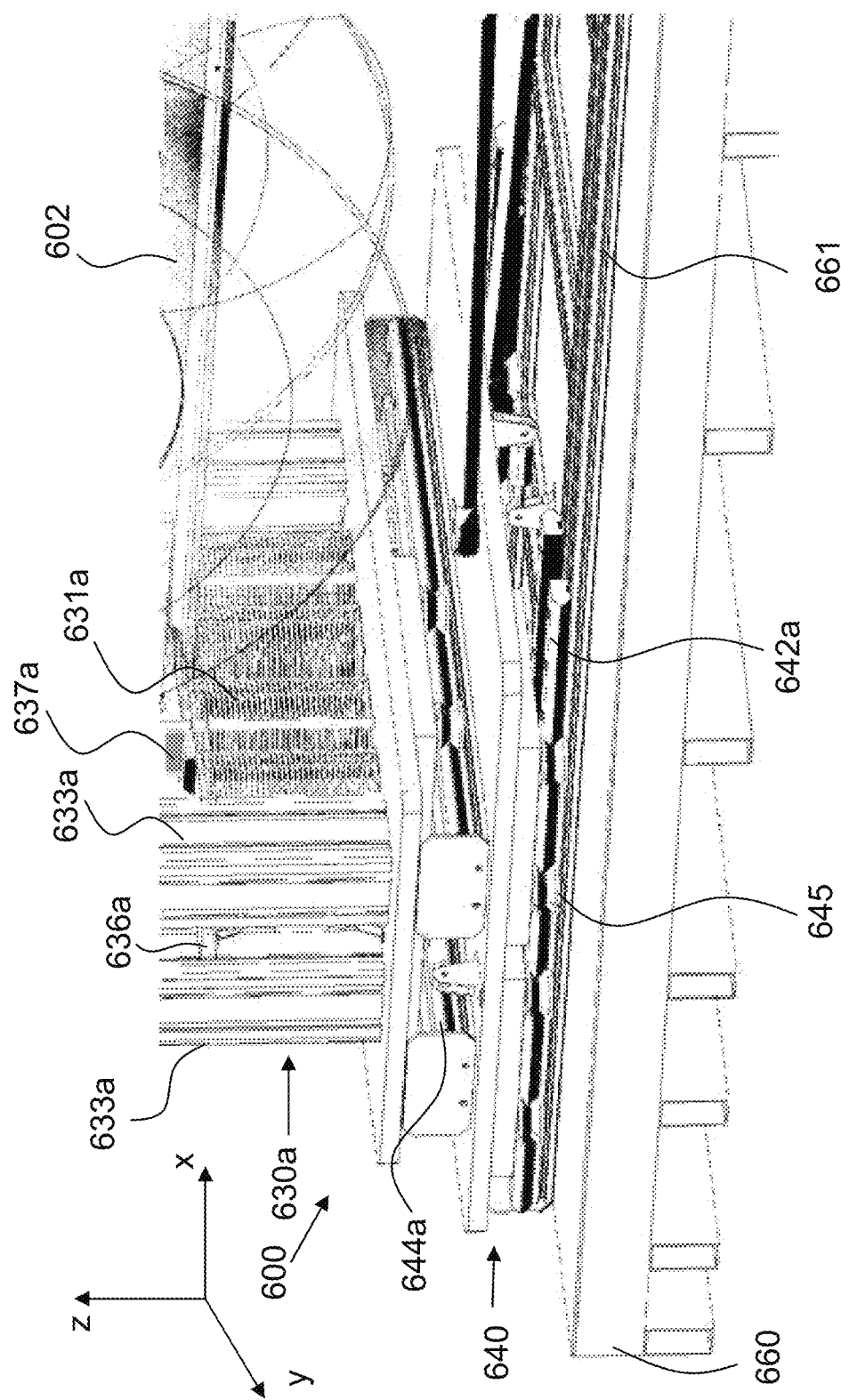
FIG. 9 is a detailed view of a portion of the support apparatus of FIGS. 6 to 8.

FIG. 3 partially shows a component in the form of an aircraft landing gear assembly 300, to be assembled to a body portion 350 in the form of a mount portion of an aircraft body. In the embodiment shown in FIG. 3, the mount portion 350 comprises an aft pintle mount having a first pintle mount lug 351 and a second pintle mount lug 352. The landing gear assembly 300 comprises a mounting portion 301 (see also FIGS. 7 and 8) in the form of an aft pintle mounting that extends upwardly from a strut or leg 306 of the landing gear assembly 300. The exemplary landing gear assembly 300 shown in FIG. 3 is a main landing gear assembly, further comprising a forward pintle mounting 302 (FIGS. 7 and 8). The aircraft body further comprises a corresponding forward pintle mounting (not shown) which will not be described in further detail.

The mounting portion 301 of the landing gear assembly 300 defines an orifice 307 for receiving a mounting pin 400. In the present embodiment, the pintle mounting 301 houses a bearing or bush, shown in FIGS. 4a and 4b as a spherical bearing 308, having a radially inwardly facing surface that defines the orifice 307. The body portion 350 defines at least one further orifice for receiving the mounting pin 400. In the embodiment shown in FIG. 3, at least one of the first pintle mount lug 351 and the second pintle mount lug 352 houses a bush or bearing, shown in FIG. 3 as respective bushes 353, 354, having radially inwardly facing surfaces that respectively define body portion orifices 355, 356.

FIG. 3 also shows a funnel device 380 supported by the mounting portion 350 in a predetermined position and orientation relative to the orifices 355, 356 of the body portion 350. The exemplary funnel device 380 shown in FIG. 3 has an inlet portion 380a comprising four walls 381, 382, 383, 384 each reducing in width in a direction towards an outlet portion 380b of the funnel device 380 to form a passage having a cross-sectional area that gradually narrows from a mouth end of the funnel device 380 in a direction towards the outlet portion 380b. The four walls 381, 360, 383, 384 then continue each with constant width along the outlet portion 380b to form a passage having substantially constant cross-sectional area.

Outer contours of the funnel device 380 are shaped and configured to complement and engage with corresponding contours of the mounting portion 350, to enable the mounting portion 352 to support the funnel device 380 in the predetermined position and orientation during an assembly process. For example, as shown in FIG. 3, the outlet portion 380b is sized to snuggly fit in a gap between inwardly facing walls of the gear lugs, or prongs, 351, 352 so as to locate the funnel device 380 laterally relative to the mounting portion 301. The funnel device 380 is also located vertically relative to the mounting portion 301, by virtue of the increase in cross-sectional area as the outer contour of the funnel device 380 transitions between the inlet portion 380a and the outlet portion 380b, limiting further vertical movement of the funnel device between the gear lugs 351, 352. The outlet portion 380b of the funnel device 380 is configured to extend vertically without obstructing access of the pin 400 through the orifices 355, 356, of the gear lugs 351, 352. The funnel device 380 is retained in place at least in part due to friction between the outlet portion 380b and the gear lugs 351, 352. Additionally or alternatively, other types of temporary retaining means (not shown) may be provided to retain the funnel device 380 in place.

The funnel device 380 is shaped and configured to receive a protruding portion of the component, in the form of the mounting portion 301, into the mouth end of the funnel device 380. Internal guide surfaces formed by the walls 381, 382, 383, 384 serve to guide movement of the mounting portion 301 through the passage such that the cross-section of the mounting portion 301 is received and located within the outlet portion passage of corresponding constant cross-sectional area to constrain and locate the mounting portion 301 in a predetermined position laterally. A wall 384 of the inlet portion 380a of the funnel device 380 is partially cut away to define a slot 385 therein, to accommodate movement of supporting structure 303 of the landing gear assembly 300 as the mounting portion 301 moves upwardly through the funnel device 380. The funnel device 380 is thus adapted to funnel an upwardly moving portion of a component in the form of the pintle mounting portion 301 into a predetermined position relative to the pintle mount portion 350 to thereby position the orifice 307 of the mounting portion 301 in a desired position relative to the orifice 355 of the mount portion 350.

Figure 14:
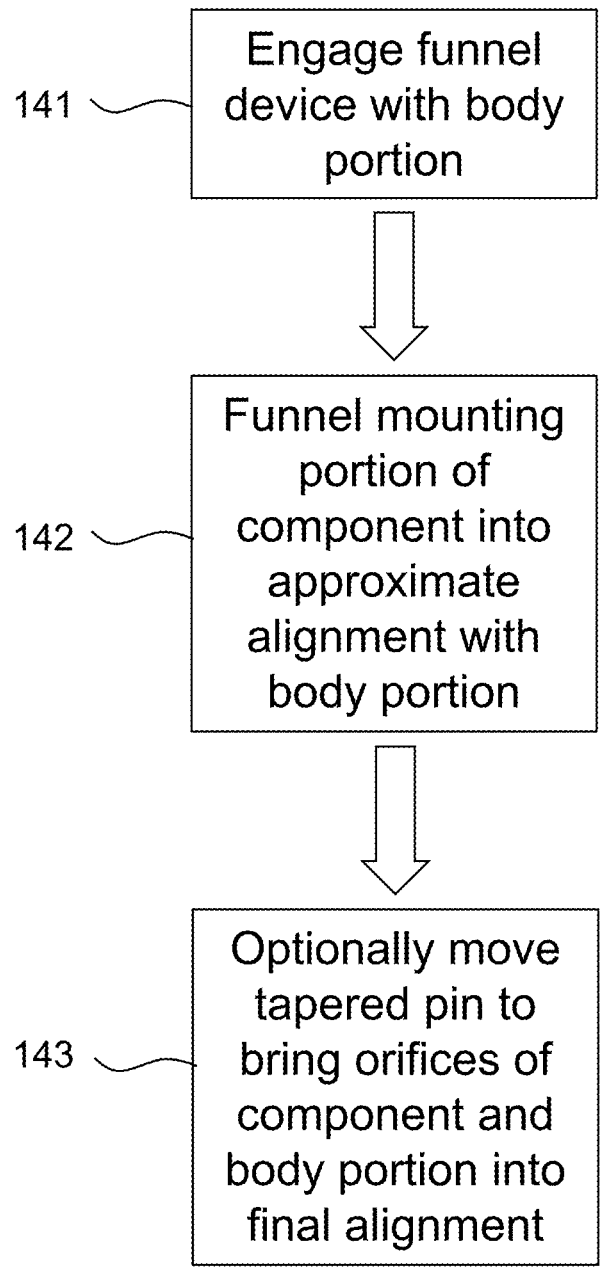
FIG. 14 shows a method of assembling a component to an aircraft body portion.

The funnel device 380 can be used in a method of assembling a component to an aircraft body portion (FIG. 14), to guide a portion of the component relative to the body portion for movement into a desired position for assembly. The funnel device 380 supported in a predetermined position relative to the mount portion 350, laterally and vertically, by engaging the outlet portion 380b between the gear lugs 351, 352 such that the funnel device 380 is temporarily retained in position by friction (FIG. 14, box 141). The funnel device 380 is pushed upwardly until the wider transition to the outlet portion 380b abuts the bottom of the gear lugs 351, 35, thereby correctly vertically locating the funnel device 380 in the desired position. The funnel device 380 is also pushed laterally inwardly of the cleft between the gear lugs 351, 352 until it abuts an inner wall 360 of the cleft, thereby correctly laterally locating the funnel device in the desired position.

The mounting portion 301 of the landing gear assembly 300 is then placed proximal the funnel device 380 at the mouth end of the funnel device 380. Force is applied to the landing gear assembly 300 to move the mounting portion 301 upwardly into and through the inlet portion 380a, causing the guide surfaces of the walls 381, 382, 383, 384 to guide the mounting portion 301 centrally of the funnel, thereby funneling the mounting portion 301 into the outlet portion 380b. The mounting portion 301 is caused to move through the outlet portion 380b, constrained and located laterally, until the orifice 307 of the mounting portion 301 is brought into approximate axial alignment (i.e., +/−10%, or 5%) with the orifice 355 of the pintle mount lug 351 with the orifices 307, 355 partially overlapping one another (FIG. 14, box 142).

Figures 5A, 5B:
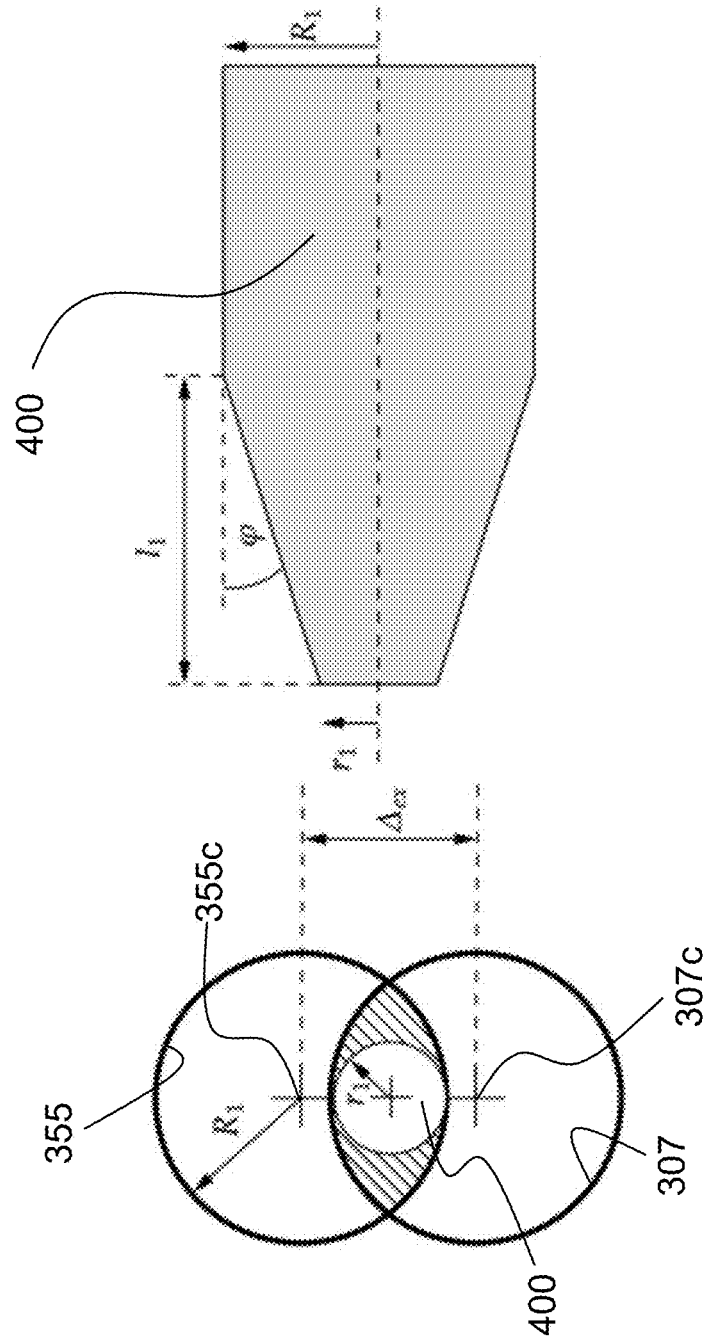
FIG. 5a shows a side view of a portion of a pin according to an embodiment, in further detail.
FIG. 5b shows a front end of the pin relative to a region of overlap of the orifices of the component and the body portion.
Figure 6:
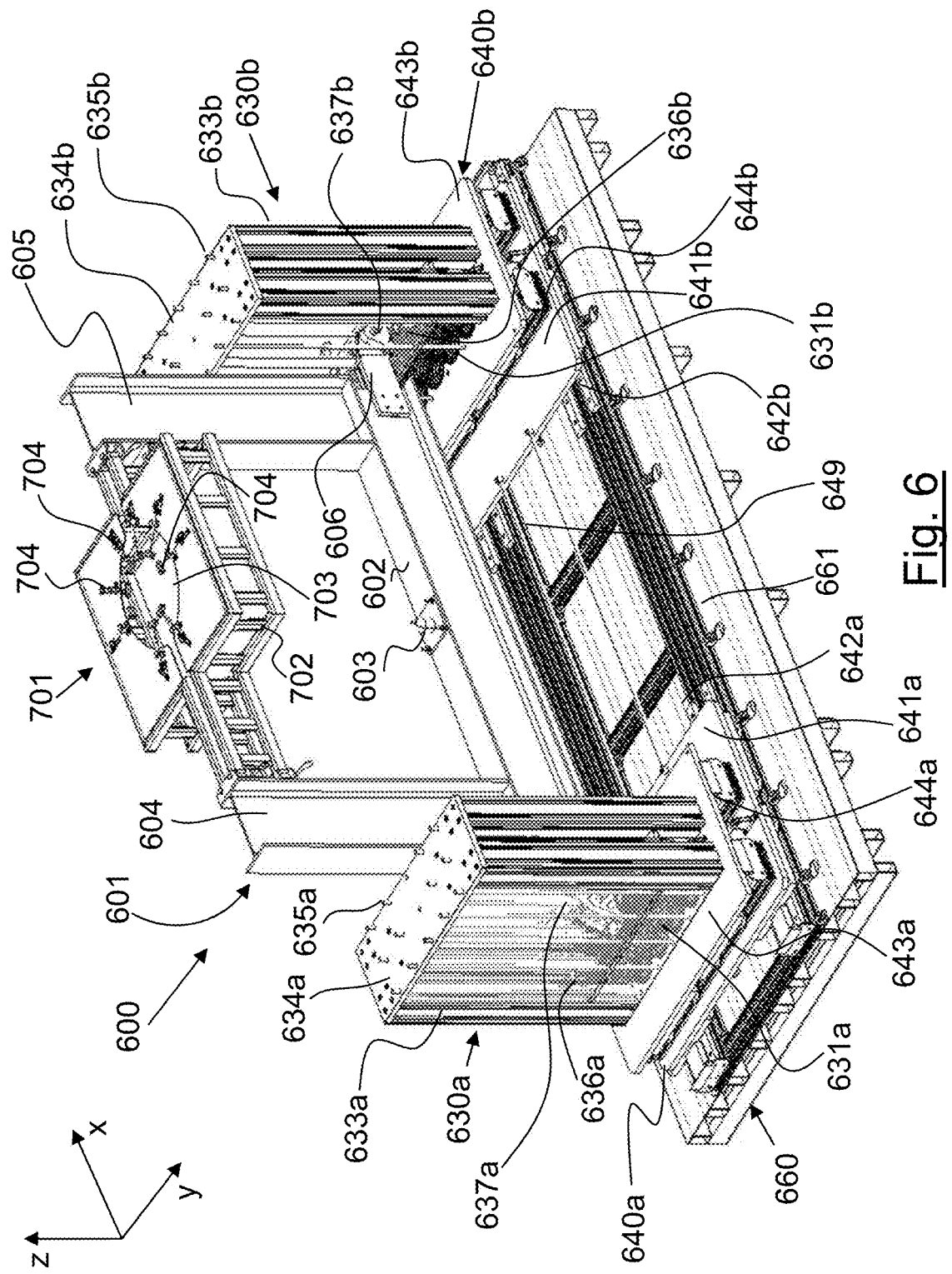
FIG. 6 is a perspective view of a support apparatus according to an embodiment.

An end portion of the pin 400 is shown in greater detail in FIG. 5a. The main portion of the pin 400 has a radius R1, which gradually tapers along a length $l_1$ down to a radius r1 at the tapered end (the left-hand end in FIG. 5a) of the pin 400, at angle of taper φ relative to a direction parallel to the center axis C-C of the pin 400. With the orifices 355, 356 partially overlapping one another, the tapered end of the pin 400 can be inserted through the overlapping region of the orifices 307, 355, as best seen in FIG. 5b.

FIG. 4a illustrates a method of applying force to axially move the pin 400 through the region of overlap such that the tapering surface of the pin 400 drives and guides the landing gear assembly 300 to center the orifice 307 relative to the orifices 355, 366, thereby moving the landing gear assembly 300 from the approximately aligned eccentric position shown in FIG. 4d through a vertical distance $\Delta e_x$ to bring the geometric centers of the orifice sees 307, 355 into alignment with one another (FIG. 14, box 143). The orifices 307, 355 are self-aligning consequent to the insertion of the pin 400, mitigating the need for time-consuming and/or difficult control and monitoring of the vertical, lateral and rotary position of the landing gear assembly 300. Furthermore, depending on the angle of taper, the axial force exerted on the pin 400 is reduced compared to the force needed to adjust the vertical position of the landing gear assembly 300 directly. In the FIGS. 4a and 4b, it can be seen that the spherical bearing 308 rotates within the mounting portion 301 to accommodate movement of the pin 400 therethrough. However, it will be apparent that, in alternative embodiments, mounting portions with non-spherical bearings can also be used with this method.

In some embodiments, the tapered pin 400 may be removed, with the landing gear assembly 300 supported in position, and a non-tapered pintle pin inserted. In other embodiments, the tapered pin 400 may be designed for use as a pintle pin, and remain in place for operational use.

The methods described above can be used with a wide variety of landing gear assemblies and types of aircraft, from on the one hand relatively lightweight landing gear assemblies having a mass in the region of about 10 kg to 40 kg which may for example be liftable by hand, including for example landing gear assemblies for unmanned aerial vehicles, to on the other hand heavy landing gear assemblies, for example having a mass in the region of about 500 kg to 2,000 kg and which require power assisted lifting, for example main landing gear assemblies for a large passenger or cargo aircraft. In the context of this disclosure, a heavy component is a component having a mass that cannot be conveniently lifted and manipulated during an assembly operation without machine-assisted lifting.

To enable or facilitate performance of the above-described assembly methods, using a funnel device and/or a tapered pin, when assembling heavy components, there will now be described a support apparatus to support a heavy component in an installation location for mounting to a body. FIGS. 6, 7, 8 and 9, show support apparatus 600 that is adapted to passively assist movement of a supported component, in the form of a landing gear assembly 300 (FIGS. 7 and 8), at least in a direction of a vertical axis Z. Reference axes X, Y, Z (FIGS. 6 to 9), are used herein for convenience. The Z axis extends in a vertical direction, that is, aligned with the direction of gravitational force. The X and Y axes extend in mutually perpendicular directions, laterally of the direction of the Z axis.

The apparatus 600 permits the landing gear assembly 300 to be repositioned from an approximately aligned position, with the orifice 307 of the mounting portion 301 overlapping the orifice 355 of a gear rib, into a desired final alignment position with the orifices 307, 355 in final alignment, using a reduced level of force to move the landing gear assembly 300, relative to the unassisted level of force that would otherwise be necessary to move the landing gear assembly 300. Because the apparatus 600 provides passive support, while permitting the landing gear 300 to move in accordance with an externally applied force, assembly processes can be designed that use the self-aligning tapered pin method to bring a heavy landing gear assembly 300 into final alignment with a pintle mount lug of an aircraft body.

The support apparatus, or support platform, 600 includes a first support portion in the form of a mounting frame 601 having a base portion 602 adapted to support all or most of the weight of a heavy component, for example an elongate component such as an aircraft landing gear assembly 300 (FIGS. 7 and 8), for example having a mass of up to about 1500 kg or more. The base portion 602 of the frame 601 in the embodiment illustrated in FIGS. 6 to 9 comprises an I-section beam, and can be made of any suitably rigid and strong material, such as aluminum or steel alloy, or any other suitable metallic alloy or composite material. The base portion 602 has a pivot mount 603 fixedly supported thereon. The pivot mount 603 is adapted to pivotably engage with a lower end portion of the component, to permit tilting of the component on the pivot mount 603 relative to the vertical axis Z, and rotation of the component on the pivot mount 603 about an upwardly extending axis A-A (FIG. 8) of the component. In the embodiment shown, the pivot mount 603 comprises an upstanding rigid member having a spherical end portion. In use, the pivot member engages within a downwardly facing cavity (not shown) of the component. The cavity may take the form, for example, of an oversized cylindrical closed end bore, formed in a known manner at a bottom end of the main leg strut 306 of the landing gear 300.

The mounting frame 601 further comprises an upwardly extending portion in the form of first and second respective I-section beams 604, 605 connected to respective opposite end portions of the base portion 602. A second support portion, generally indicated using reference sign 701, comprises a lateral support frame 702 having opposite ends that are respectively connected to respective upper end regions of the upwardly extending beams 604, 605, the upper end regions being distally disposed relative to the base portion 602. The support frame 702 defines a round through passage 703 that extends vertically through a central portion of the support frame 702. The passage 703 is sized to receive an upper region of the component therethrough, when the component is orientated in an upright position on the mounting frame 601, as shown in FIGS. 7 and 8. The support frame 702 is divided into two sections which are releasably connected together, such that they can be released from one another in order to admit the upper region of the leg strut 306 into the passage 703.

The support frame 702 comprises, supported around the edge region of the passage 703, resilient lateral support members 704 that extend laterally inwardly towards a central region of the passage 703. As seen in FIGS. 7 and 8, each of the support members 704 comprises a resilient device, such as a pneumatic damper or oleo strut, having a curved pad at an inwardly facing end thereof. The pads of the support members 704 are adapted to engage with the main leg strut 306 of the landing gear assembly 300 in an upper region thereof, at a location on the leg strut 306 distal the bottom end of the leg strut 306 and above the center of gravity of the landing gear assembly 300. The landing gear assembly 300 is thus supported in an upright orientation while permitting tilting of the landing gear assembly 300 about the pivot mount 603 in response to an externally applied force by virtue of resilient lateral deflection of one or more of the support members 704. Providing the lateral support members 704 at a vertical location distal the bottom of the leg strut 306 and/or above the center of gravity of the landing gear assembly 300 enables a relatively long moment arm about the pivot mount 603.

The support apparatus 600 further comprises a vertical movement arrangement 630a, 630b to support and guide movement of the mounting frame 601 along an axis Z extending in the vertical direction. The vertical movement arrangement 630a, 630b includes a resilient arrangement 631a, 631b. The vertical movement arrangement 630a, 630b and the resilient arrangement 631a, 631b are supported on an X-Y arrangement, shown generally as 640a, 640b. The X-Y arrangement 640a, 640b supports and guides the vertical movement arrangement 630a, 630b, and thus the mounting frame 601, for movement along axes X, Y that extend in respective mutually perpendicular directions lateral to the vertically extending axis Z. The X-Y arrangement 640a, 640b is mounted on a horizontally extending base 660. The base 660 is of rigid and sturdy construction, suitable for engaging a lifting device and for rigidly supporting the other components of the support apparatus 600 and the lifting gear assembly 300 during lifting and assembly operations. In the example shown, the base comprises ribs extending laterally in mutually perpendicular directions, and an upper surface to which is mounted an upper reinforcing structure 661 that is rigidly constructed for mounting the X-Y arrangement 640a, 640b and resisting forces transmitted within the support apparatus 600.

The X-Y lateral movement arrangement comprises first and second horizontally extending lower tables 641a, 641b respectively mounted to respective first and second lower guides 642a, 642b (FIG. 9) for horizontal movement therealong in a direction of a first lateral axis X. The lower tables 641a, 641b are interconnected such that they move together, for example using a pair of elongate ties 649 of suitably strong and rigid material. The X-Y lateral movement arrangement further comprises third and fourth horizontally extending upper tables 643a, 643b respectively mounted to respective third and fourth upper guides 644a, 644b for horizontal movement along the upper guides in a direction of a second lateral axis Y that extends laterally of the first lateral axis X, the upper guides 644a, 644b being fixedly mounted on the lower tables 641a, 641b respectively. In the embodiment shown in FIGS. 6 to 9, each of the upper and lower guides 642a, 642b, 644a, 644b comprises two or more sets of tracks, or guide rails. Each of the upper and lower tables 641a, 641b, 643a, 643b comprises on its respective underside two or more sets of followers, in the form of wheels 645 (FIG. 9), that follow the respective guide rails of the upper and lower guides 642a, 642b, 644a, 644b. The skilled person will be aware of many alternative forms of X-Y arrangements for permitting movement in any lateral direction.

The vertical movement arrangement 630a, 630b comprises first and second vertically extending guide arrangements, each comprising i) first and second sets of pillars 633a, 633b supporting respective first and second rod support plates 634a, 634b and ii) first and second sets of vertically extending guide rods 635a, 635b supported between each respective upper table 643a, 643b and a respective rod support plate 634a, 634b. The vertical movement arrangement 630a, 630b further comprises first and second horizontally extending members in the form of mounting plates 636a, 636b for mounting the mounting frame. The plates 636a, 636b respectively extend horizontally between a respective set of pillars 633a, 633b and comprise vertically extending passages through which the guide rods 635a, 635b extend, such that the plates 636a, 636b are supported and guided for vertical movement. The plates 636a, 636b lie above and are resiliently supported by respective sets of resilient members in the form of springs of the resilient arrangement 631a, 631b.

The mounting frame 601 is connected to the vertical movement arrangement 630a, 630b for movement therewith. In the embodiment shown, first and second opposite end portions of the base portion 602 of the mounting frame 601 are respectively connected to the respective mounting plates 636a, 636b. For this purpose, a respective lug 637a, 637b is fixed to an upper surface of each respective plate 636a, 636b, each lug being connected to a respective connection arm 606 extending rigidly from a respective end of the base portion 602.

The resilient arrangement 631a, 631b resiliently assists movement of the mounting frame 601, together with a supported component such as the landing gear assembly 300, in a direction of the vertical axis Z. The forces necessary to drive vertical alignment, assisted by the support apparatus 600, are considered below.

The X-Y arrangement provides two further degrees of freedom of movement along the lateral axes X, Y. The pivot mount 603 further supports the landing gear assembly 300 with three further degrees of freedom of movement in rotation, namely about the vertical axis Z and about each of the lateral axes X, Y. The support apparatus 600 is arranged such that the force necessary to move a mounting portion 301 of a supported landing gear assembly 300 in a direction of any of the five further degrees of freedom of movement is relatively low, for example less than 100 N. Thus, when lifting the support apparatus 600 at an installation location using a lifting device (not shown), for example a forklift or any other suitable powered lifting device, using the funnel device 380 to approximately align the orifice 307 of the mounting portion 301 with the orifice 355 of the mount portion 350, the funnel device is able to funnel and self-align the mounting portion with only the vertical relative alignment needing to be controlled using the lifting device.

The springs of the resilient arrangement 631a, 631b are loaded by placing the landing gear assembly 300 or other heavy component onto the pivot mount 603 of the mounting frame 601 until the aggregate spring reaction force balances the weight of the landing gear assembly 300. The springs are pre-compressed to some extent by a limiter (not shown) placing an upward limit on the travel of the plates 636a, 636b in the unloaded condition, thereby facilitating quicker and more stable loading of the landing gear assembly 300. After lifting the support apparatus 600 with the supported landing gear such that the centers 307c, 355c of the orifices 307, 355 are approximately aligned, separated by vertical eccentricity $\Delta e_x$, the external force $F_{ext}$ necessary to move the orifices 307, 355 into final alignment is $$F_{ext} = k_t \Delta e_x \quad \text{[EQ. 1]}$$

where $k_t$ is the spring stiffness in N/m.

Figure 10:
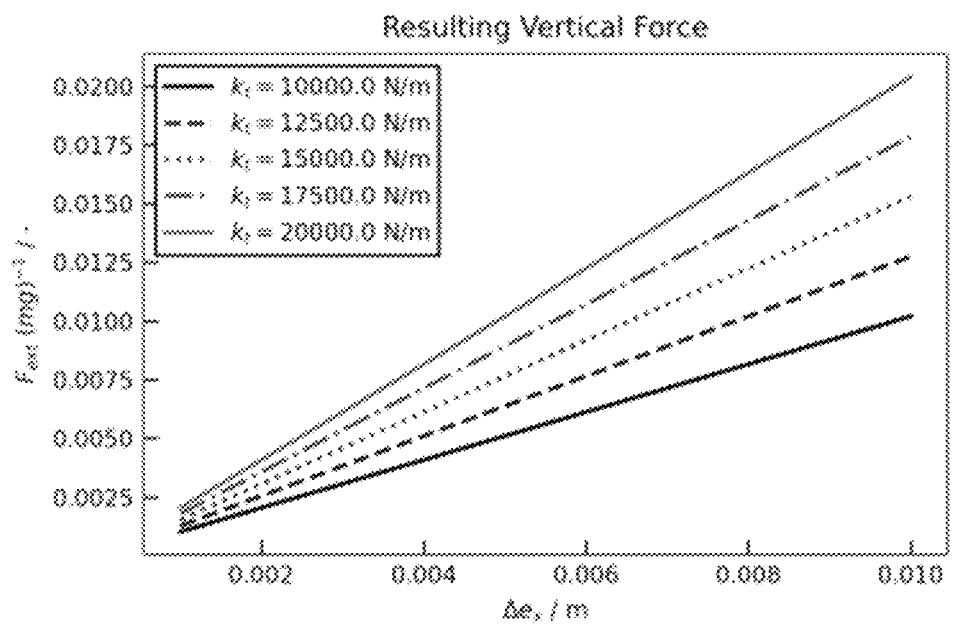
FIG. 10 is a chart showing the variation in vertical force required to move a landing gear assembly through a range of vertical distances, for different spring stiffnesses.

FIG. 10 is a chart showing the variation in external vertical force $F_{ext}$ required to move a supported landing gear assembly into alignment through a range of vertical distances, or eccentricities, $\Delta e_x$ for a range of spring stiffnesses kt. The dimensionless units of the vertical axis are vertical force $F_{ext}$ in Newtons divided by landing gear weight in Newtons (landing gear mass m×standard gravitational acceleration g). For example, as is apparent from FIG. 10, for a spring constant of 12500.0 N/m and an alignment movement of about 0.008 m with a landing gear of mass 1250 kg, the force $F_{ext}$ can be estimated as:

$$F_{ext} = 0.0100 \times (\text{mass of landing gear} \times \text{standard gravity}) = \quad \text{[EQ. 2]}$$
$$0.0100 \times (1250 \times 9.81) 122.6 \, \text{N}$$

In some embodiments, the order of magnitude for the vertical force $F_{ext}$ on the pin 400 due to the spring deflection may, for example, be arranged to lie in the range of 100 N to 500 N, and by adjusting the spring stiffness kt and the target maximum eccentricity $\Delta e_x$.

Figure 15:
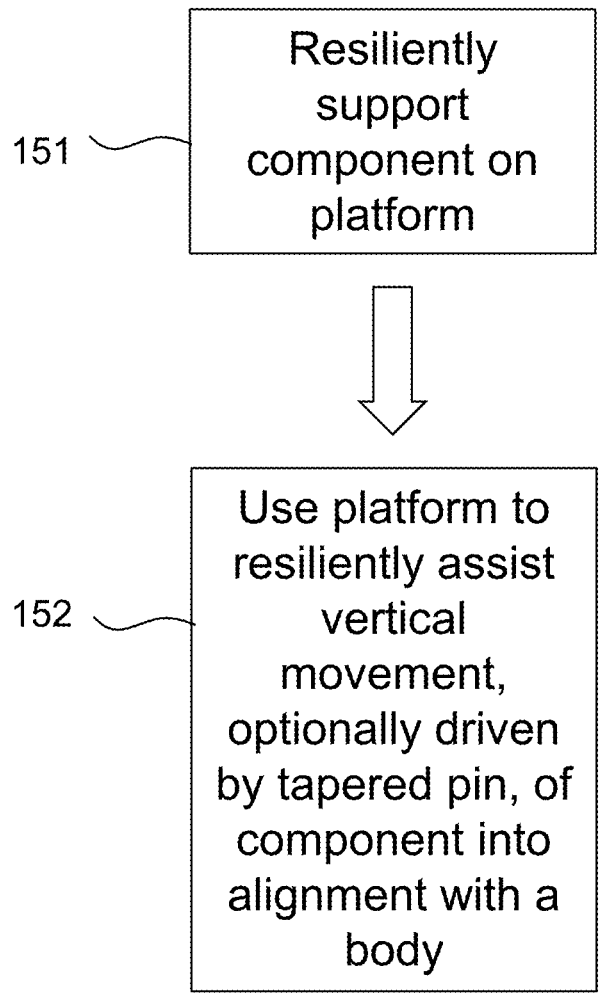
FIG. 15 shows a method of assembling a heavy component to a mount portion of a body.

In a method of assembling the landing gear assembly 300 to the mount portion 350 of an aircraft body, the landing gear assembly 300 is supported on the support apparatus 600 (FIG. 15, box 151) and thereby passively assists vertical movement of a mounting portion 301 of the landing gear assembly 300 into alignment with the mount portion 350 (FIG. 15, box 152). The support apparatus 600 is moved by a lifting device into an installation location such that the mounting orifice 307 overlaps with the mount orifice 355 in approximate alignment therewith such that central axes of the respective orifices are vertically offset by a distance $\Delta e_x$ sufficient to enable the insertion of an end of the tapered portion of the pin 400 into the orifices. During lifting or other movement of the support apparatus 600 with the landing gear assembly 300 supported thereon, the landing gear assembly 300 may be locked in position to improve stability. In a preferred embodiment, the funnel device 380 is used to accurately guide the landing gear assembly 300 into the approximately aligned position. Axial force is then applied to the pin 400 to fully insert the pin 400, thereby guiding the mounting portion 301 into final alignment with the mount portion 350. Following mounting of the pintle pin, the landing gear assembly 300 can be released from the support apparatus 600, and the support apparatus removed from the installation location.

Figure 11:
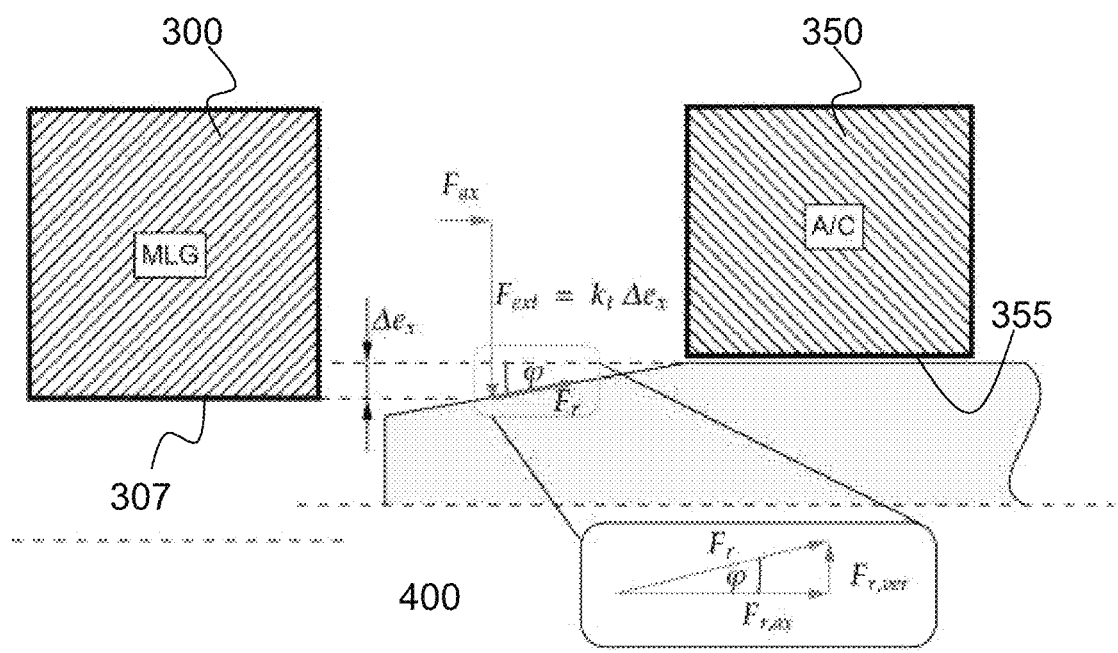
FIG. 11 is a schematic representation of forces acting on the pin.

FIG. 11a is a schematic representation of forces acting on the pin 400 during insertion of the pin 400 through the orifices 307, 355 (moving to the left is shown in FIG. 11). The axial force $F_{ax}$ needed to push the pin 400 in, taking into account friction, can be expressed by $$F_{ax} = F_{ext}(\tan(\varphi) + \mu) \quad \text{[EQ. 3]}$$

where $\mu$ is the friction coefficient. FIG. 11 also illustrates the axial reaction force $F_{r,ax}$ due to friction at the tapered surface of the pin as the pin is inserted.

Figure 12:
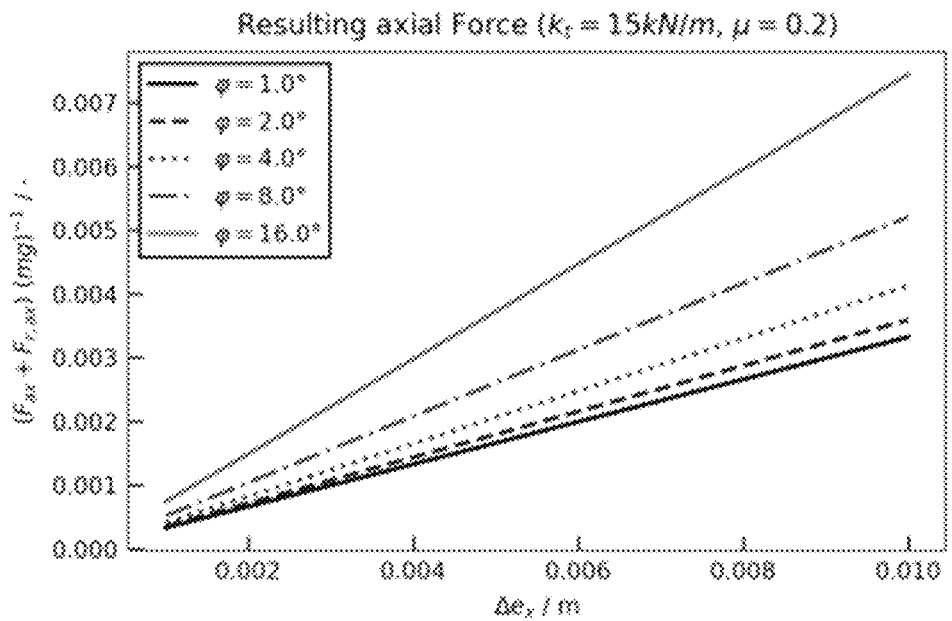
FIG. 12 is a chart showing axial force exerted on the pin during alignment, for different vertical distances and different taper angles.
Figure 13:
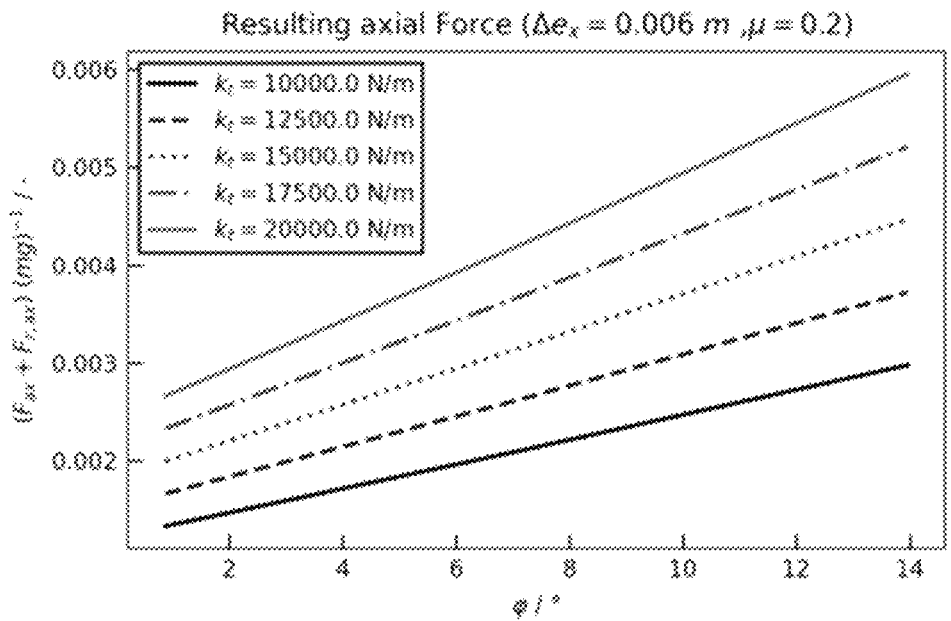
FIG. 13 is a chart showing axial force exerted on the pin during alignment, for different taper angles and different spring stiffnesses.

FIG. 12 shows a level of axial force necessary to insert the pin 400 during alignment, taking into account friction, $F_{ax}+F_{r,ax}$, normalized according to the mass of the landing gear in a similar manner to FIG. 10, for different eccentricities $\Delta e_x$ and taper angles $\varphi$, with a spring stiffness $k_t$ of 15 kN/m and coefficient of friction p of 0.2 at the tapered surface of the pin. FIG. 13 shows a level of axial force necessary to insert the pin 400 during alignment, taking into account friction, $F_{ax}+F_{r,ax}$, normalized according to the mass of the landing gear in a similar manner to FIG. 10, for different taper angles $\varphi$ and spring stiffnesses $k_t$, with eccentricity $\Delta e_x$ of 0.006 m and coefficient of friction $\mu$ of 0.2 at the tapered surface of the pin.

Using the support apparatus 600, axial forces required to push the pin 400 to align the orifices may, in some examples, lie in a range of 3 N to 50 N, depending on other selected system variables such as the spring stiffness $k_t$, the eccentricity $\Delta e_x$ and the taper angle $\varphi$ of the pin 400. Use of a smaller taper angle $\varphi$ is generally convenient as smaller angles result in smaller required axial pushing force, but design choice may be limited, for example by a requirement for a smaller radius $r_1$ at the tapered end to enable insertion at greater eccentricities $\Delta e_x$, and/or by the required maximum axial taper length $1_1$.

Various embodiments described above facilitate automated, or partially automated assembly. For example, in some examples a robotic device such as an automated guided vehicle (AGV) may be used to lift the support apparatus to position the landing gear assembly into the approximately aligned position using the funnel device, reducing the number of sensors and/or the complexity of control that would otherwise be necessary. Furthermore, while in some examples the pin 400 can be manually pushed by an operator to align the orifices 307, 355, in other examples pin insertion may be automated, reducing complexity, including the requirement for sensors, because of the self-aligning nature of the process.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

While the embodiments above are described with reference to landing gear assemblies having aft and forward pintle mountings, and aircraft having aft and forward pintle mounts at least one of which has multiple gear lugs, it will be appreciated that in alternative embodiments i) the landing gear assembly may have only one pintle mounting and the aircraft one corresponding pintle mount, and/or that ii) the or each pintle mount may have one or more gear lugs. While the illustrated funnel device 380 is configured to engage between the prongs of a cleft mounting portion 301, many alternative ways of locating and/or temporarily retaining the funnel device 380 in position relative to a mounting portion, including mounting portions having a single gear lug, will be apparent to the skilled person.

In some alternative embodiments, funnel devices may be configured to funnel other portions of a component for assembly, for example sidestays and/or actuator assemblies, and more than one funnel may be used to guide more than one respective portion of the component relative to the body portion for movement into a desired position during an assembly operation. In some embodiments, alternative types of resilient arrangement are envisaged, including for example use of a hydraulic system arranged to provide constant pressure analogous to the weight of the component to be supported. While in the embodiments described above a separate lifting device is used to lift the support apparatus into the installation location to partially align the landing gear assembly 300 with the aircraft body, in alternative embodiments the support apparatus may be provided with an integral lifting device.

Further embodiments are disclosed in the following numbered clauses:

Clause 1. Support apparatus adapted to support a component in an installation location for assembly to a body, wherein the apparatus is adapted to passively assist movement of a supported component in a direction of a vertical axis to reduce an external force necessary to reposition the component from an approximate alignment position into a desired final alignment position.

Clause 2. Support apparatus according to clause 1, wherein the apparatus comprises a resilient arrangement to resiliently assist movement of the supported component in a direction of a vertical axis.

Clause 3. Support apparatus according to clause 1 or 2, adapted to support a further degree of freedom of movement of the supported component about an upwardly extending axis of the component.

Clause 4. Support apparatus according to any preceding clause, adapted to support four further degrees of freedom of movement of the supported component along and about lateral axes that extend in respective mutually perpendicular directions lateral to the vertical axis.

Clause 5. Support apparatus according to any preceding clause, comprising a first support portion adapted to support the weight of the component, the first support portion comprising a pivot mount adapted to pivotably engage with a first portion of the component to thereby permit tilting of the component relative to the vertical axis and/or rotation of the component about an upwardly extending axis of the component.

Clause 6. Support apparatus according to clause 5, wherein the first portion is a lower end portion of an elongate component, and the pivot mount comprises a pivot member adapted to engage within a cavity formed in a downwardly facing surface of the first portion.

Clause 7. Support apparatus according to clause 5 or 6, comprising a second support portion adapted to engage with a second portion of the component at a location of the component distal the first portion of the component, so as to support the component in an upright orientation while permitting tilting of the component about the pivot mount in response to an externally applied force.

Clause 8. Support apparatus according to clause 7, wherein the second support portion comprises at least one laterally extending support member adapted to engage the component at a location above the component's center of gravity, the or each support member being operable to resiliently deflect laterally in response to an externally applied force to permit tilting of the component.

Clause 9. Support apparatus according to any of clauses 5 to 8, wherein the first support portion comprises: a base portion comprising the pivot mount; and at least one upwardly extending portion that supports the second support portion.

Clause 10. Support apparatus according to any of clauses 5 to 9, comprising an X-Y arrangement to support and guide movement of the first support portion along lateral axes that extend in respective mutually perpendicular directions lateral to the vertically extending axis.

Clause 11. Support apparatus according to clause 10, wherein the X-Y arrangement comprises: first and second horizontally extending tables respectively mounted to respective first and second guides for horizontal movement therealong in a direction of a first lateral axis X; and third and fourth horizontally extending tables respectively mounted to respective third and fourth guides for horizontal movement therealong in a direction of a second lateral axis Y that extends laterally of the first lateral axis X, the third and fourth guides being fixedly mounted relative to the first and second tables respectively.

Clause 12. Support apparatus according to any of clauses 5 to 11, comprising a vertical movement arrangement to support and guide movement of the first support portion along an axis extending in the vertical direction, the vertical movement arrangement including a resilient arrangement.

Clause 13. Support apparatus according to clauses 12, wherein the vertical movement arrangement comprises first and second horizontally extending members resiliently supported by the resilient arrangement, and first and second vertically extending guide arrangements respectively engaged with the first and second members so as to support and guide the members for vertical movement, first and second opposite end portions of the first support portion being respectively connected to the respective first and second members.

Clause 14. Support apparatus according to clauses 12 or 13, wherein the vertical movement arrangement and the resilient arrangement are supported on the X-Y arrangement.

Clause 15. Support apparatus according to any of clauses 5 to 14, wherein first support portion is connected to the vertical movement arrangement for movement therewith.

Clause 16. Support apparatus according to any preceding clause, wherein the component is an aircraft landing gear assembly, the apparatus being adapted to passively assist movement of a supported landing gear assembly in a direction of the vertical axis to reposition a pintle orifice of the landing gear assembly from an approximate alignment position relative to a pintle mounting orifice of an aircraft body into final relative alignment, while permitting guided movement of the pintle orifice about a longitudinal axis of the landing gear assembly and/or along and/or about mutually perpendicular laterally extending axes.

Clause 17. A method of assembling a heavy component to a mount portion of a body, the method comprising resiliently supporting the component on a platform and thereby resiliently assisting vertical movement of a mounting portion of the component into alignment with the mount portion of the body.

Clause 18. A method according to clause 17, further comprising: moving the platform into an installation location, such that the mounting portion of the component is approximately aligned with the mount portion of the body; applying external force to guide the mounting portion of the component into final alignment with the mount portion of the body; assembling the mounting portion of the component to the mount of the body; and releasing the component from the platform.

Clause 19. A method according to clause 17 or 18, comprising moving the platform into an installation location, such that a mounting orifice of the mounting portion of the component partially overlaps with a mount orifice of the mount portion of the body, with respective central longitudinally extending axes of the respective orifices vertically offset from one another.

Clause 20. A method according to any of clauses 17 to 19, wherein the component is a landing gear assembly, the mounting portion of the component is a pintle mounting of the landing gear assembly, and the mount portion of the body is a pintle mount of an aircraft, wherein guide force is applied by driving a pin having a tapered end portion though an orifice of the pintle mounting and into an orifice of the pintle mount.

Clause 21. A method according to clause 20, wherein the pin is a pintle pin, whereby the driving of the pin transmits a positional adjustment force between the mounting portion of the landing gear assembly and the mount portion of body to bring the pintle mounting orifice into alignment with the pintle mount orifice, thereby mounting the landing gear to the aircraft mount with the pintle pin in its assembly position.

Clause 22. A method according to any of clauses 17 to 21, comprising supporting a funnel device in a predetermined position relative to the mount portion of the body, and lifting the platform such that the mounting portion of the component is guided laterally by the funnel device while being lifted into approximate vertical alignment with the mount portion of the body.

Clause 23. A platform adapted to support an aircraft landing gear assembly in an upright orientation, to enable fine alignment of a pintle orifice of the landing gear with a pintle mount orifice of an aircraft body, the platform comprising:
  a. a base;
  b. a frame to support the weight of the aircraft landing gear assembly; and
  c. vertical movement apparatus for vertically moving the frame relative to the platform base, the vertical movement apparatus including at least one resilient arrangement resiliently supporting the frame to reduce the external force required to vertically move the aircraft landing gear assembly when supported by the frame.

Clause 24. A platform according to clause 23, adapted to support a lower portion of the aircraft landing gear assembly on the frame so as to permit rotation of the component relative to the frame about an upwardly extending axis of the aircraft landing gear assembly, and to provide resilient lateral support to an upper portion of the aircraft landing gear assembly to enable tilting of the aircraft landing gear assembly relative to a vertical axis.

Clause 25. A platform according to clause 23 or 24, further comprising: at least one first table supported by the base for movement in a direction of a first lateral axis; at least one second table supported by the or each respective first table for movement relative thereto in a direction of a second lateral axis extending transversely of the first lateral axis; the vertical movement apparatus being supported by the or each second table.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments. The term 'or' shall be interpreted as 'and/or' unless the context requires otherwise.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for assembling a component to an aircraft body portion, the method comprising:
   using a funnel device to guide a portion of the component relative to the body portion for movement into a desired position for assembly, the body portion defining an orifice for receiving a mounting pin;
   locating the funnel device in a predetermined position relative to the orifice of the body portion; and
   supporting the funnel device in a predetermined position relative to the body portion,
   wherein the funnel device is configured to receive and guide a mounting portion of the component, the mounting portion defining an orifice for receiving the mounting pin, and
   wherein the method further comprises:
   placing the mounting portion proximal the funnel device and applying force to the component to move the mounting portion into and through the funnel device, whereby the mounting portion is funneled such that the orifice of the mounting portion is brought into approximate axial alignment with the orifice of the body portion.

2. The method according to claim 1, further comprising:
   moving a pin, having a tapered end portion, through the orifice of the component and the orifice of the body portion such that the pin brings the orifices into final mutual axial alignment.

3. The method according to claim 1, wherein the component comprises a landing gear assembly for an aircraft, the mounting portion extending upwardly from a strut of the landing gear assembly and housing a pintle bearing or bush defining the orifice of the mounting portion, and the body portion comprises a lug housing a pintle bush or bearing defining the orifice of the body portion, and the method further comprising:
   bringing the orifices into alignment relative to a pintle axis.

4. The method according to claim 2, wherein the pin having a tapered end portion is a pintle pin.

5. The method according to claim 1, further comprising:
   using more than one funnel to guide more than one respective portion of the component relative to the body portion for movement into a desired position for assembly.

6. The method as claimed in claim 5, further comprising:
   supporting the component on a support apparatus, and
   vertically lifting the component on the support apparatus through the funnel, the support apparatus permitting movement of the component in at least one lateral direction under guidance forces exerted by the funnel.

7. A funnel device configured to be supported by a body portion in a predetermined position and orientation relative to an orifice of the body portion during an assembly process, the funnel device further configured to funnel a portion of a component into a predetermined position relative to the body portion, to thereby position an orifice of the component in a desired position relative to the orifice of the body portion,
   wherein the funnel device comprises at least one internal guide surface formed by at least one wall, and defines a through passage having a mouth end portion to receive a protruding portion of the component, the through passage having a cross sectional area that gradually narrows from the mouth end portion towards an opposite end portion of the through passage, the opposite end portion having a cross sectional area configured to receive and locate the protruding portion in the predetermined position.

8. The funnel device as claimed in claim 7, wherein contours of the funnel device are configured to engage with contours of the body portion to enable the body portion to support the funnel device in the predetermined position and orientation during the assembly process.

9. The funnel device as claimed in claim 7, wherein the funnel device is configured to funnel a pintle mounting portion of an aircraft landing gear assembly into a predetermined position relative to a pintle mount portion of an aircraft body, such that a pintle orifice of the landing gear assembly is in a desired position relative to a pintle orifice of the aircraft.

10. The funnel device as claimed in claim 7, wherein the funnel device is between two prongs of an aft pintle bearing mount of an aircraft body, and is configured for funnelling a pintle mounting portion of an aircraft landing gear assembly into a predetermined position between the prongs.

* * * * *